Patented Apr. 28, 1936

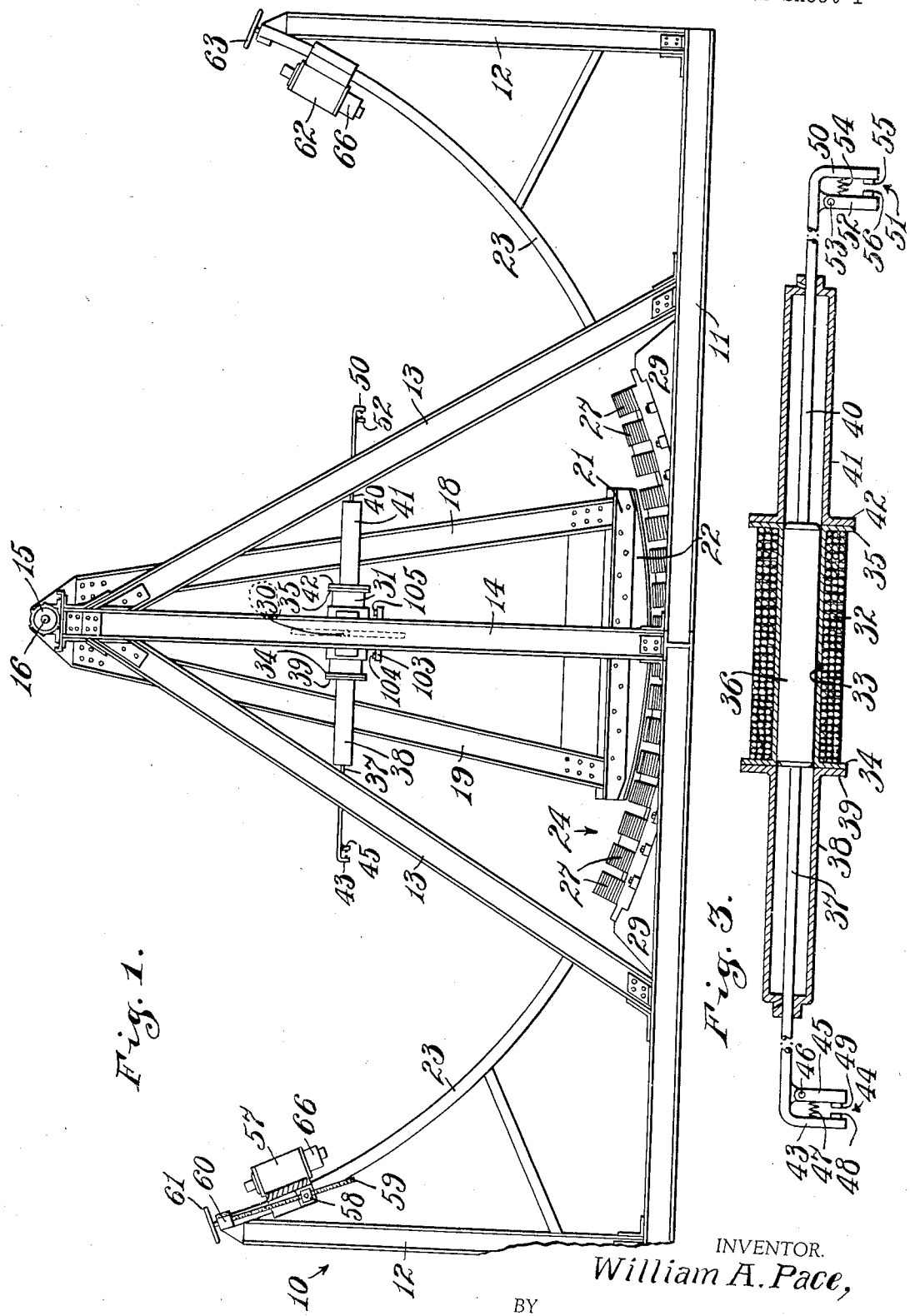

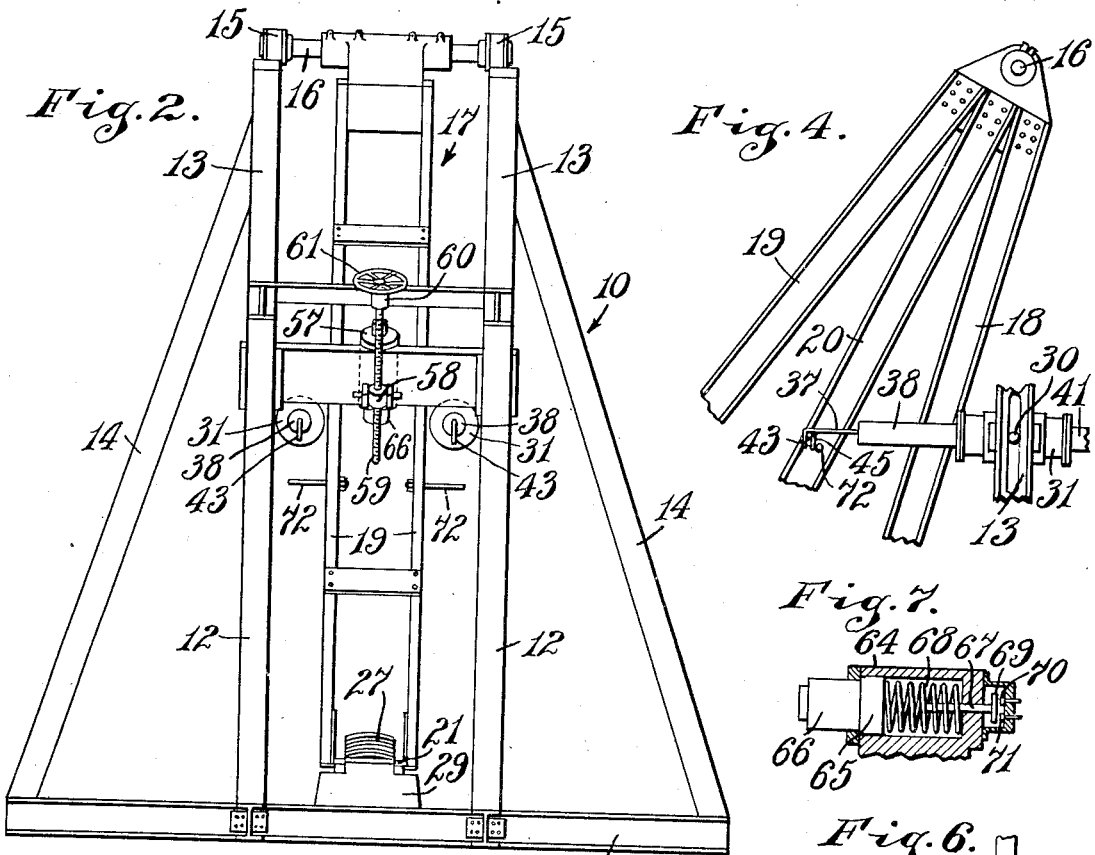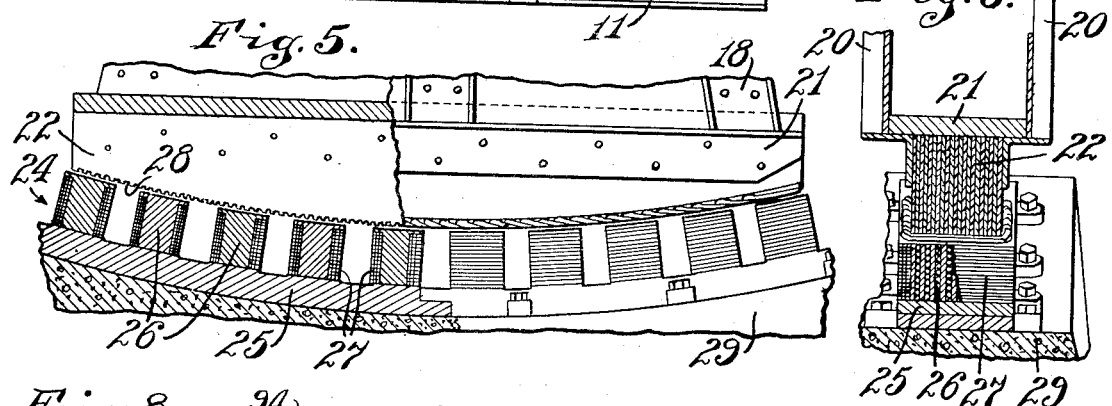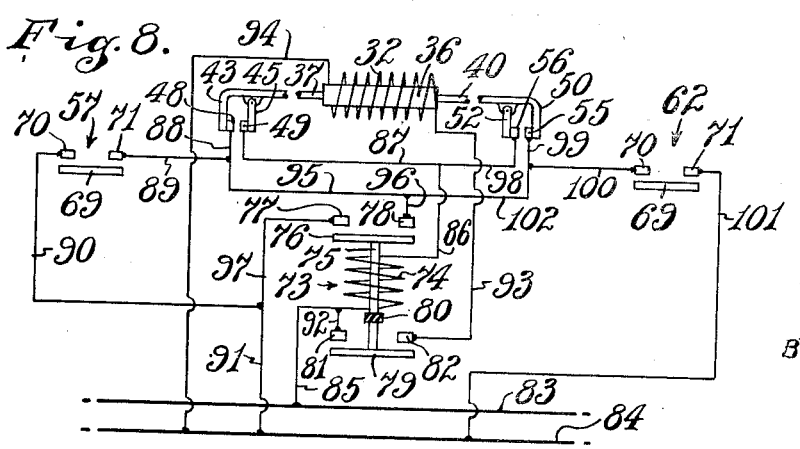

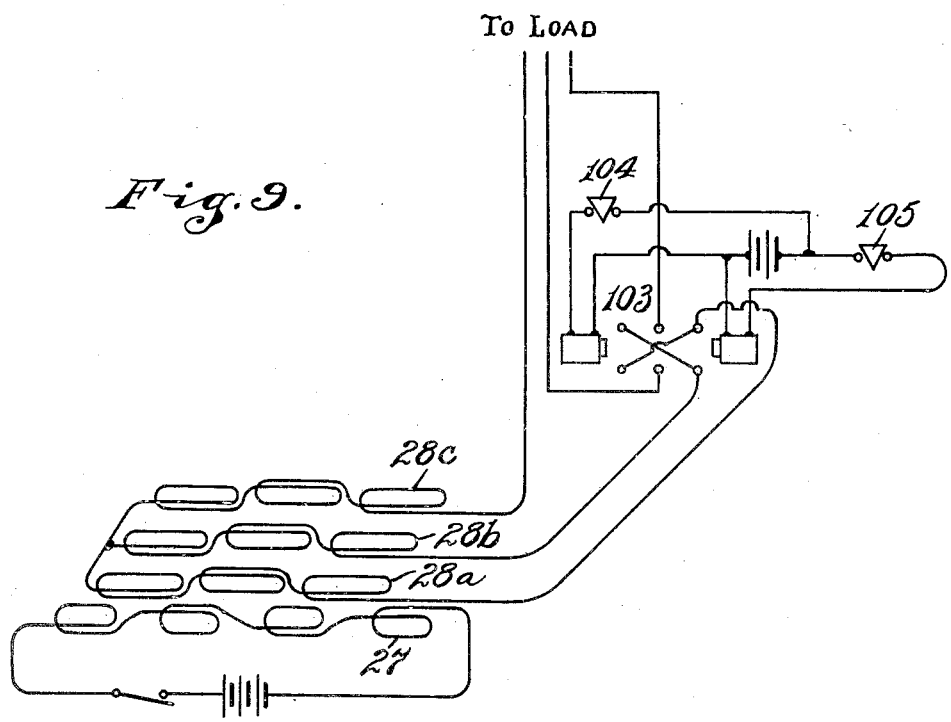

2,038,954

UNITED STATES PATENT OFFICE 2,038,954

MOTOR GENERATOR

William A. Pace, Bedford, Ind.

Application February 2, 1933, Serial No. 654,819

17 Claims. (Cl. 171—123)

The present application relates to an electric motor-generator set, and more particularly to novel apparatus of the type mentioned in which the armature is oscillable, instead of being rotatable in accordance with the practice heretofore established.

The primary object of the invention is to provide a device of the class described by means of which electric current of certain characteristics may be utilized in the generation of electric current of entirely different characteristics. A further object of the invention is to provide a motor generator set comprising a wound stator, a wound, oscillable armature operatively associated with said stator, and a reciprocating motor for driving said armature. A further object of the invention is to provide an oscillating engine. A further object of the invention is to provide mechanism for driving an oscillator. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of a motor-generator set constructed in accordance with the present invention;

Fig. 2 is an end elevation thereof;

Fig. 3 is an enlarged vertical section through the motor of the mechanism illustrated in Fig. 1;

Fig. 4 is a fragmental side elevation showing the manner of operation of a feature of the mechanism;

Fig. 5 is an enlarged view of the stator and armature, parts being shown in section for clarity of illustration;

Fig. 6 is a section taken at right angles to the plane of Fig. 5;

Fig. 7 is an enlarged sectional view of a detail;

Fig. 8 is a wiring diagram of the motor operating mechanism; and

Fig. 9 is a typical wiring diagram showing stator and pendulum circuits.

Referring more particularly to the drawings, it will be seen that the mechanism of the present application comprises a frame indicated generally at 10 and made up of a base 11, end uprights 12, and angularly arranged braces 13 and 14 forming, roughly, a pyramid at the apex of which are mounted two bearings 15 in which is journalled a rock shaft 16 carrying a pendulum indicated generally at 17. Said pendulum comprises a frame made up of braces 18, 19, and 20, said frame supporting at its lower, free end, a shoe 21 in which is supported a laminated armature element 22. The main frame 10 comprises also a pair of curved slideways 23, said slideways forming arcs of a circle having its center in the axis of the shaft 16.

The stator, indicated generally at 24, comprises a base element 25 shaped and positioned to be concentric with the shaft 16, a plurality of laminated pole pieces 26 carried by said base and likewise shaped and positioned so that their upper surfaces are concentric with the shaft 16; and windings 27 carried by said pole pieces 26. The lower surface of the laminated armature 22 is likewise concentric with the shaft 16 and is formed to provide a plurality of transversely extending notches 28 for receiving the armature windings which, for a three-phase installation, would comprise the three series of overlapping coils 28a, 28b, 28c (Fig. 9). The stator as a whole is preferably mounted upon a concrete base 29.

It will be obvious that, if the pendulum 17 is oscillated to swing the armature 22 back and forth across the surface of the stator 24, the pole pieces 26 being suitably magnetized, the windings of the armature 22 will be energized to supply current to a load connected to said windings. The necessary leads may be carried up the leg 18 or 19 of the pendulum, and so to a stationary point on the frame, whence they may be carried in any suitable manner to the load. Of course, it is to be understood that the windings 27 of the pole pieces 26 are connected to a suitable source of current, and that the windings of the armature 22 are suitably connected to a load.

It will also be obvious that, as the direction of movement of the armature 22 past the pole pieces 26 is reversed, the current generated in the windings of the armature 22 will likewise be reversed. Under many circumstances, such a reversal of the current flow in the windings of the armature 22 will not be objectionable; but there are circumstances under which such a reversal would be objectionable as, for instance, where the current generated is being used in a three-phase circuit. Therefore, means to be described hereinafter may be provided for modifying the effective arrangement of the leads from the armature windings as the direction of movement of the armature 22 past said pole pieces is reversed, to compensate for such reversal.

Suitably mounted for oscillation upon pivots 30 mounted in intermediate uprights 13 are two solenoids 31. Since the solenoids 31 are identical, only one will be described in detail.

Referring to Fig. 3, it will be seen that the solenoid 31 comprises a coil 32 wound upon a cylindrical shell 33 provided with radially extending flanges 34 and 35 at its opposite ends. A core 36 is slidably received within the shell 33; and it will be understood that, when the coil 32 is energized, it will tend to draw the core 36 into the position illustrated in Fig. 3.

Rigidly connected to one end of the core 36 is a stem 37 projecting axially therefrom and slidably received in a shell 38 having a flange 39 suitably secured to the flange 34 of the shell 33. A stem 40 is rigidly secured to the opposite end of the core 36 and projects axially therefrom, being slidably mounted in the shell 41 having a flange 42 suitably secured to the flange 35 of the shell 33.

At its free end which projects beyond the shell 38, the stem 37 is formed with a down-turned end 43 forming a part of a switch indicated generally at 44. A finger 45, pivoted at 46 to the stem 37, is normally urged to the position illustrated in Fig. 3 by a spring 47 abutting at one end the finger 45 and at the other end the hook 43. Said hook 43 carries a contact point 48 and the finger 45 carries a cooperating contact point 49, said contact points being suitably connected in an electric circuit in a manner later to be described.

Similarly, the free end of the stem 40 is down-turned to form a hook 50 comprising a part of a switch indicated generally at 51. A finger 52 is pivoted at 53 to said stem 40 and a spring 54 normally urges said finger 52 to the position illustrated in Fig. 3. The hook 50 carries a contact point 55, and the finger 52 carries a cooperating contact point 56, said contact points being suitably connected in an electric circuit hereinafter to be described.

A combined bumper and switch, indicated at 57, is slidably mounted upon one slideway 23, and mechanism is provided for shifting said element 57 toward and away from the armature 24. Such mechanism comprises a nut 58 swivelled to said element 57 and threadedly receiving a screw 59 which is non-reciprocably mounted in a bearing 60 swivelled to the uprights 12, and which carries a hand-wheel 61. A similar bumper and switch indicated generally at 62 is slidably mounted upon the other slideway 23, and is similarly adjustable through the medium of a similar screw operated by a hand-wheel 63.

Since the elements 57 and 62 are identical, only one will be described. Referring to Fig. 7, it will be seen that each of the elements 57 and 62 comprises a casing 64 in which is mounted for reciprocation a plunger 65 carrying a projection 66 which protrudes from the casing 64 and which may preferably be made of rubber or some other relatively flexible and resilient material. Slidably mounted within the casing 64 is a rod 67 carrying at one end a contact element 69 adapted, at times, to bridge two electric contact points 70 and 71, said contact points being connected in an electric circuit hereinafter to be described. The plunger 65, when shifted to the right as viewed in Fig. 7, compresses the spring 68 and, just before it reaches the end of its stroke, engages the rod 67 to shift the element 69 into contact with the points 70 and 71. Said spring 68, of course, normally tends to hold the elements 65 and 67 in the positions illustrated in Fig. 7.

Each of the members 20 of the pendulum 17 carries a laterally projecting pin 72 and, as is clearly indicated in Fig. 4, said pins are adapted, as the pendulum swings, to engage the fingers 45 and 52. The mechanism is so proportioned that, as the pendulum nears the lefthand limit of its stroke, as viewed in Fig. 1, the pins 72 will engage the fingers 45 of the stems 37. As the pendulum continues to swing toward the lefthand limit of its stroke, the fingers 45 are moved to bring their contact points 49 into contact with the contact points 48; and, as the pendulum continues to swing, the stems 37 are carried with the pendulum, thereby shifting the cores 36 toward the left, and out of their median position. As the pendulum reaches the lefthand limit of its stroke, it strikes the projection 66 of the element 57 to shift the plunger 65 thereof, thereby moving the element 69 into bridging contact with the points 70 and 71.

Referring, now, to Fig. 8, it will be seen that the solenoid winding 32 is connected in a circuit including contact points 81 and 82 adapted to be bridged by an element 79 of a magnetically operated switch indicated generally at 73. Said switch comprises a solenoid coil 74, the core of which comprises a stem 75 carrying at its upper end a bridge piece 76 adapted to bridge contacts 77 and 78 connected in electric circuits hereinafter to be described. The bridge piece 79 is carried by, but electrically insulated from, said stem 75 by an insulating block 80.

A source of electric current is indicated by the two wires 83 and 84. A wire 85 connects the wire 83 with one end of the coil 74. The opposite end of said coil 74 is connected by a wire 86 with a wire 87 which, in turn, is connected to the contact point 49. The contact point 48 is connected by a wire 88 with a wire 89 connected to the contact point 71 of the switch 57. The contact point 70 of the switch 57 is connected by a wire 90 to a wire 91 which is connected to the line wire 84.

It will thus be seen that, when the pin 72 first moves the finger 45 to shift the contact point 49 into contact with the contact point 48, no circuit is established; but, when the armature 22 strikes the projection 66 of the switch 57 to shift the element 69 into bridging contact with the points 70 and 71, a circuit is established to energize the coil 74, as follows:—Line 83, wire 85, coil 74, wire 86, wire 87, contact point 49, contact point 48, wire 88, wire 89, contact point 71, element 69, contact point 70, wire 90, wire 91, to line 84.

A wire 92 connects the wire 85 with the contact point 81. The contact point 82 is connected by a wire 93 with one end of the solenoid coil 32; and the opposite end of said coil 32 is connected by a wire 94 to the line wire 84.

Thus, when the coil 74 is energized by closure of the above traced circuit, the stem 75 is shifted upwardly, as viewed in Fig. 8, to move the bridge piece 79 into bridging contact with the contact points 81 and 82; and a circuit energizing the solenoid coil 32 is established as follows:—Line wire 83, wire 85, wire 92, contact point 81, bridge piece 79, contact point 82, wire 93, coil 32, wire 94, to line 84.

It will be understood of course, that the coils of both solenoids 31 are simultaneously energized to return the cores 36 simultaneously to their median positions. It will also be seen that, as said coils are returned to their median positions, an impulse is imparted to the pendulum 17, through the pins 72, tending to swing said pendulum toward the right-hand limit of its stroke as viewed in Fig. 1. The first movement of the pendulum 17 away from the left-hand limit of its stroke releases the plunger 65 of the element 57 and permits the spring 68 to return the element 69 to the position of Fig. 7, thus breaking the above-described circuit energizing the coil 74. It is desirable, however, to maintain energization of the coils 32 until the cores 36 have been returned to their median positions illustrated in Fig. 3. Energization of the coils 32 can be maintained only by holding the bridge piece 79 in contact with the points 81 and 82; and it follows that it is necessary to maintain energization of the coil 74 until such time as the core 36 has been returned to its median position.

The pendulum under the combined influence of gravity and the kick imparted to it by the initial movement of the core 36 toward its middle position may possibly descend toward its middle position more rapidly than the concurrent movement of the core 36 toward its middle position, or the magnetic flux of the solenoid may be so designed that the speed of movement of core 36 toward the middle position will be equal to the descending movement of the pendulum. In any event core 36, under the influence of its energizing coil, will not pass materially beyond its middle position, as is well known.

A wire 95 connects the wire 88 with a wire 96 connected to the contact point 78. The contact point 77 is connected through a wire 97 to the wire 91 which is connected to the line wire 84. When the stem 75 is shifted upwardly by energization of the coil 74 to bridge the contact points 81 and 82, the bridge piece 76 is likewise shifted upwardly into bridging relation with the contact points 77 and 78, thus establishing a holding circuit for maintaining energization of the coil 74 regardless of the position of the element 69, such holding circuit being traced as follows:—Line wire 83, wire 85, coil 74, wire 86, wire 87, contact point 49, contact point 48, wire 88, wire 95, wire 96, contact point 78, bridge piece 76, contact point 77, wire 97, wire 91, to line wire 84. Thus, although the original energizing circuit for the coil 74 including the element 69 is broken as the armature 22 starts to swing toward the right-hand limit of its stroke, the energizing circuit for the coils 32 is held closed through the above-described shunt circuit until such time as said above-described shunt circuit is broken at 48—49.

Throughout the movement of the cores 36 toward their median positions, the solenoids 31 are acting as motors urging the pendulum 17 toward the right-hand end of its stroke. When said cores reach their median position, the momentum of the pendulum, combined with the force of gravity, causes the pendulum to continue on its stroke, carrying the pins 72 out of contact with the fingers 45, whereby the springs 47 are permitted to return the fingers 45 to the positions of Figs. 3 and 8, thereby breaking the energizing circuit for the coil 74, permitting the stem 75 to drop to the position of Fig. 8, and breaking the energizing circuits for the coils 32.

The pendulum 17 continues to swing past the stator 24 until the pins 72 engage the fingers 52 and move the contact points 56 into contact with the contact points 55. Continuing on its stroke, the pendulum shifts the cores 36 toward the right and finally strikes the projection 66 of the element 62, moving the element 69 of the switch 62 into contact with contact points 70 and 71 of said switch 62. When said contact points 70 and 71 of the switch 62 are bridged, an energizing circuit for the coil 74 is established as follows:—line wire 83, wire 85, coil 74, wire 86, wire 98, contact point 56, contact point 55, wire 99, wire 100, contact point 70, element 69, contact point 71, and wire 101, to line wire 84. The bridge pieces 79 and 76 are thus moved into bridging relation, respectively, with the contact points 81 and 82 and the contact points 77 and 78 to establish an energizing circuit for the coil 32 as follows:—line wire 83, wire 85, wire 92, contact point 81, bridge piece 79, contact point 82, wire 93, coil 32, wire 94, to line wire 84; and to establish a holding circuit for the coil 74 as follows:—line wire 83, wire 85, coil 74, wire 86, wire 98, contact point 56, contact point 55, wire 99, wire 102, wire 96, contact point 78, bridge piece 76, contact point 77, wire 97, and wire 91, to line wire 84.

The energization of the coils 32 will thus be continued to return the cores 36 to their median positions until such time as the pins 72 release the fingers 52 to permit the springs 54 to break the holding circuit at 55—56, thus permitting the stem 75 to drop to the position of Fig. 8.

This cycle will be continued so long as the circuits of Fig. 8 are supplied with current.

When the disclosed mechanism is used under circumstances wherein the reversal of generated current in response to the reversal of direction of movement of the armature 22 would be undesirable, an electrically actuated reversing switch 103 of well known form is positioned adjacent one of the solenoids 31. It will be obvious that, as the pendulum moves toward the left-hand end of its stroke as viewed in Fig. 1, the solenoids 31 will be tilted in a clockwise direction as viewed in Fig. 1; and, as the pendulum swings toward the opposite end of its stroke, the solenoids 31 will be tilted in a counterclockwise direction, as viewed in Fig. 1. Control buttons 104 and 105 are mounted on the upper surface of the switch 103, and said buttons control the switch 103 connected in the circuits of the armature windings in such a manner that, when the button 104 is depressed, the leads from said armature windings will be associated in one arrangement and, when the button 105 is depressed said leads will be associated in a different arrangement to compensate for the reversal in direction of movement of said armature 22. Thus, as the pendulum swings toward the right-hand limit of its stroke, the solenoid 31 will be tilted to depress the button 104; and as the pendulum nears the opposite limit of its stroke, the solenoid 31 will depress the button 105.

It will be obvious that, depending upon the manner of wiring the armature and the stator, and upon the manner of drawing current from the armature, either direct or alternating current may be generated, and that the generated current may be used in a single phase or in any polyphase circuit. The manner of wiring the mechanism will also determine the working voltage; and the frequency of the generated current may be varied by varying the positions of the switches 57 and 62. While I prefer to use an electric, reciprocating motor for driving the armature, it will be obvious that the armature may be driven by any other suitable power means. The primary use of the disclosed device is, of course, in the generation of current for commercial use. In practice, the herein disclosed generator has heretofore been used by the applicant to drive electric motors for commercial purposes.

I claim as my invention:

1. In a device of the class described, a series of field poles, arranged substantially upon an arc of a circle, an armature mounted to oscillate about the center of such circle upon a path cutting, at times, the fields surrounding said poles, said armature path extending materially beyond the ends of said field pole series, and means associated with said armature and automatically operable, when said armature reaches one limit of its oscillation, to stop said armature and to exert upon said armature an impulse urging said armature to swing away from said limit.

2. In a device of the class described, a series of field poles, arranged substantially upon an arc of a circle, a pendulum mounted to oscillate about the center of such circle, an armature mounted at the free end of said pendulum and operatively associated with said poles to pass through the fields surrounding said poles, and power means associated with said pendulum and actuable, when said armature reaches one limit of its stroke out of generating relation with said field pole series, to initiate movement of said armature away from said one limit by exerting on said pendulum a power impulse.

3. In a device of the class described, a series of field poles, arranged substantially upon an arc of a circle, a pendulum mounted to oscillate about the center of such circle, an armature mounted at the free end of said pendulum and operatively associated with said poles, said armature being provided with leads, power means controlled by said pendulum to drive said pendulum, and means actuated by movement of said pendulum to modify the effective arrangement of the leads from said armature upon each reversal in direction of oscillation of said armature to compensate for such reversal.

4. In an electric generator, a frame, a series of pole pieces associated with said frame and arranged upon an arc of a circle in a vertical plane, a pendulum mounted upon said frame for oscillation in the plane of such circle and about the center thereof, a wound armature carried at the free end of said pendulum and swinging, with said pendulum, on a path cutting the fields surrounding said pole pieces, electrical leads connecting the windings of said armature with a point of use of current, and power means associated with said pendulum and operable to assist gravity to continue said pendulum in oscillation.

5. In an electric generator, a frame, a series of pole pieces associated with said frame and arranged in an arc of a circle, a wound armature mounted upon said frame and associated with said pole pieces, said armature being provided with electrical leads from its winding to a point of use of current, and being oscillable in the plane of such circle and about the center thereof, and power means for driving said armature.

6. In combination, a wound stator formed on the arc of a circle, an armature mounted to oscillate about the center of such circle in operative association with said stator, a solenoid including a core having a stem engageable by said armature, as said armature nears one limit of its stroke, to shift said core axially, a normally open switch carried on said stem and adapted to be closed upon engagement of said stem by said armature, a second normally open switch adapted to be contacted and closed by said armature at said limit of the stroke of said armature, an energizing circuit for said solenoid, a switch in said circuit, and means, including said first and second switches, for controlling said last-named switch.

7. In combination, a wound stator formed on the arc of a circle, an armature mounted to oscillate about the center of such circle in operative association with said stator, a solenoid including a core having a stem engageable by said armature, as said armature nears one limit of its stroke, to shift said core axially, a normally open switch carried on said stem and adapted to be closed upon engagement of said stem by said armature, a second normally open switch adapted to be contacted and closed by said armature at said limit of the stroke of said armature, an energizing circuit for said solenoid, a magnetically controlled switch in said circuit, and means, including said first and second switches, for controlling said last-named switch whereby, when said first and second switches are concurrently closed, said last-named switch will be closed, and whereby said last-named switch will be opened only upon opening of said first-named switch.

8. In combination, a wound stator formed on the arc of a circle, an armature mounted to oscillate about the center of such circle in operative association with said stator, a solenoid including a core having a stem engageable by said armature, as said armature nears one limit of its stroke, to shift said core axially, a normally open switch carried on said stem and adapted to be closed upon engagement of said stem by said armature, a second normally open switch adapted to be contacted and closed by said armature at said limit of the stroke of said armature, an energizing circuit for said solenoid, a switch in said circuit, an electro-magnet for controlling said last-named switch, an energizing circuit for said magnet including said first switch and said second switch, and a second energizing circuit for said magnet including said first switch and a switch controlled by said magnet, and excluding said second switch.

9. In combination, a wound stator formed on the arc of a circle, an armature mounted to oscillate about the center of such circle in operative association with said stator, a solenoid including a core having a stem engageable by said armature, as said armature nears one limit of its stroke, to shift said core axially, a normally open switch carried on said stem and adapted to be closed upon engagement of said stem by said armature, a second normally open switch adapted to be contacted and closed by said armature at said limit of the stroke of said armature, an energizing circuit for said solenoid, a switch in said circuit, an electro-magnet for controlling said last-named switch, an energizing circuit for said magnet including said first switch and said second switch in series, and a second energizing circuit for said magnet including said first switch and, in series with said first switch, means controlled by said magnet for shunting said second switch.

10. In combination, a wound stator formed on the arc of a circle, an armature mounted to oscillate about the center of such circle in operative association with said stator, a solenoid including a core having a stem engageable by said armature, as said armature nears one limit of its stroke, to shift said core axially, a circuit for energizing said solenoid to return said core to its initial position, thereby imparting to said armature an impulse tending to swing said armature toward the opposite limit of its stroke, a switch for controlling said circuit, magnetic means for closing said switch, and a circuit for energizing said magnetic means, said last-named circuit including a normally open switch carried by said stem and adapted to be closed upon engagement of said stem by said armature, a second normally open switch connected in series with said stem switch and adapted to be closed by said armature when said armature reaches said first-named limit of its stroke, and a third switch connected in series with said stem switch and in parallel with said second switch and operable, upon energization of said magnetic means, to shunt said second switch.

11. In combination, a frame, a pendulum mounted on said frame to swing in a substantially vertical plane, a solenoid mounted on said frame and including a core having a stem, said pendulum engaging said stem, as said pendulum nears one limit of its stroke, to shift said core axially, a circuit for energizing said solenoid to return said core to its initial position, thereby imparting to said pendulum an impulse tending to swing the same toward the opposite limit of its stroke, a switch in said solenoid energizing circuit, and magnetic means controlled by said pendulum for closing said switch when said pendulum reaches said limit of its stroke.

12. In combination, a frame, a pendulum mounted on said frame to swing in a substantially vertical plane, a solenoid mounted on said frame and including a core having a stem, said pendulum engaging said stem, as said pendulum nears one limit of its stroke, to shift said core axially, a circuit for energizing said solenoid to return said core to its initial position, thereby imparting to said pendulum an impulse tending to swing the same toward the opposite limit of its stroke, a switch in said solenoid energizing circuit, magnetic means for closing said switch, and a circuit for controlling said magnetic means, said last-named circuit including a normally open switch carried by said stem and positioned to be closed at all times when said pendulum is in engagement with said stem, a second switch connected in series with said stem switch and adapted to be automatically closed when said pendulum reaches said limit of its stroke, and a third switch connected in series with said stem switch and in parallel with said second switch and operable, upon energization of said magnetic means, to shunt said second switch.

13. In combination, a frame, a pendulum mounted on said frame to swing in a substantially vertical plane, a solenoid mounted on said frame for oscillation about a substantially horizontal axis, said solenoid including a core provided with oppositely extending stems, said stems being positioned to be engaged, respectively, by said pendulum as said pendulum nears the opposite limits of its stroke whereby said core is moved axially alternatively in opposite directions from its median position in response to swinging of said pendulum, a circuit for energizing said solenoid to return said displaced core to its median position, said circuit including a switch, magnetic means for closing said switch, and means for controlling said magnetic means, said last-named controlling means comprising a normally open switch carried by one of said stems and positioned to be closed whenever said pendulum is in engagement with said one stem, a second normally open switch mounted on said frame and adapted to be automatically closed when said pendulum reaches the limit of its stroke when in engagement with said one stem, a third normally open switch carried on the other one of said stems and positioned to be closed whenever said pendulum is in engagement with said other stem, a fourth normally open switch mounted on said frame and adapted to be automatically closed when said pendulum reaches the limit of its stroke when in engagement with said other stem, and a fifth switch adapted to be closed upon energization of said magnetic means, said first stem switch and said second switch being connected in series in a circuit including said magnetic means, and said third switch and said fourth switch being connected in series in a circuit including said magnetic means, said last-named circuit paralleling said circuit including said first stem switch and said second switch, and said fifth switch being connected in parallel circuits, each including said magnetic means in series with said fifth switch, and one including said first stem switch in series with said fifth switch and shunting said second switch, and the other including said third switch in series with said fifth switch and shunting said fourth switch.

14. In combination, a frame, a pendulum mounted on said frame to oscillate in a substantially vertical plane, and means for driving said pendulum, said means comprising a solenoid including a core, means associated with said pendulum and said core for causing displacement of said core in response to swinging movement of said pendulum, and means controlled by said pendulum to energize said solenoid periodically to return said core to its initial position, thereby imparting a driving force to said pendulum.

15. A motor-generator set comprising an arcuate stator, an oscillating arcuate armature associated with said stator to oscillate through the stator arc, and a reciprocating motor for driving said armature.

16. A motor-generator set comprising an arcuate wound stator, a source of current supplying current to the windings of said stator, an oscillating arcuate armature associated with said stator to oscillate through the stator arc, a reciprocating electric motor for driving said armature, and means for supplying current to drive said motor.

17. A motor generator comprising a stator made up of a plurality of pole pieces arranged upon the arc of a circle, an oscillating armature operatively associated with said stator and provided with leads, means for driving said armature, and means controlled by the oscillation of said armature for modifying the effective arrangement of the leads from said armature upon reversal of the direction of movement of said armature to compensate for such reversal.

WILLIAM A. PACE.